United States Patent
Lutz et al.

(10) Patent No.: US 9,976,462 B2
(45) Date of Patent: May 22, 2018

(54) METHOD FOR THE OPERATION OF AN EXHAUST GAS AFTERTREATMENT SYSTEM

(71) Applicant: MAN Truck & Bus AG, München (DE)

(72) Inventors: Florian Lutz, Ansbach (DE); Dieter Rothe, Nürnberg (DE)

(73) Assignee: MAN TRUCK & BUS AG, München (DE)

( * ) Notice: Subject to any disclaimer, the term of this patent is extended or adjusted under 35 U.S.C. 154(b) by 0 days. days.

(21) Appl. No.: 15/281,969

(22) Filed: Sep. 30, 2016

(65) Prior Publication Data

US 2017/0096921 A1    Apr. 6, 2017

(30) Foreign Application Priority Data

Oct. 1, 2015    (DE) .................. 10 2015 012 736

(51) Int. Cl.
*F01N 3/035* (2006.01)
*F01N 3/10* (2006.01)
(Continued)

(52) U.S. Cl.
CPC .......... *F01N 3/035* (2013.01); *B01D 46/006* (2013.01); *B01D 46/0027* (2013.01);
(Continued)

(58) Field of Classification Search
CPC . F01N 3/033; F01N 3/035; F01N 3/10; F01N 3/20; F01N 3/206; F01N 3/2066;
(Continued)

(56) References Cited

U.S. PATENT DOCUMENTS

| 7,241,431 B2 | 7/2007 | Fischer |
| 7,712,307 B2 | 5/2010 | Braun |
| (Continued) | | |

FOREIGN PATENT DOCUMENTS

| DE | 102004036036 A1 | 3/2006 |
| DE | 102015000955 A1 | 7/2015 |
| (Continued) | | |

OTHER PUBLICATIONS

European Patent Office, European Search Report, dated Jan. 20, 2017, 7 pgs.

*Primary Examiner* — Timothy C Vanoy
(74) *Attorney, Agent, or Firm* — Lucas & Mercanti, LLP

(57) ABSTRACT

The invention relates to a method for the operation of an exhaust gas aftertreatment system in an exhaust tract of an internal combustion engine. The exhaust gas aftertreatment system includes an SCR particle filter, a first reducing agent feed device for introducing the reducing agent into the exhaust tract upstream of the SCR particle filter, continuous regeneration of the SCR particle filter being possible using nitrogen dioxide as oxidizing agent, an SCR catalytic converter element arranged downstream of the SCR particle filter, and a second reducing agent feed device for introducing the reducing agent into the exhaust tract downstream of the SCR particle filter and upstream of the SCR catalytic converter element. A control unit regulates a quantity of reducing agent introduced into the exhaust tract by the first reducing agent feed device and/or by the second reducing agent feed device as a function of the temperature ($T_{SCR-PF}$) of the SCR particle filter.

16 Claims, 3 Drawing Sheets

(51) Int. Cl.
| | |
|---|---|
| *F01N 3/20* | (2006.01) |
| *F01N 3/24* | (2006.01) |
| *B01D 53/94* | (2006.01) |
| *F01N 9/00* | (2006.01) |
| *F01N 13/00* | (2010.01) |
| *B01D 46/00* | (2006.01) |
| *B01J 23/22* | (2006.01) |
| *B01J 23/72* | (2006.01) |
| *B01J 29/06* | (2006.01) |
| *F01N 3/023* | (2006.01) |
| *F01N 11/00* | (2006.01) |
| *F01N 3/08* | (2006.01) |
| *B01J 35/04* | (2006.01) |

(52) U.S. Cl.
CPC ..... *B01D 53/9431* (2013.01); *B01D 53/9495* (2013.01); *B01J 23/22* (2013.01); *B01J 23/72* (2013.01); *B01J 29/06* (2013.01); *F01N 3/0231* (2013.01); *F01N 3/208* (2013.01); *F01N 9/00* (2013.01); *F01N 11/002* (2013.01); *F01N 13/002* (2013.01); *F01N 13/009* (2014.06); *F01N 13/0093* (2014.06); *B01D 2255/20723* (2013.01); *B01D 2255/20761* (2013.01); *B01D 2255/50* (2013.01); *B01D 2279/30* (2013.01); *B01J 35/04* (2013.01); *F01N 3/0807* (2013.01); *F01N 3/0814* (2013.01); *F01N 3/0842* (2013.01); *F01N 3/103* (2013.01); *F01N 2550/05* (2013.01); *F01N 2570/14* (2013.01); *F01N 2610/02* (2013.01); *F01N 2900/1602* (2013.01)

(58) Field of Classification Search
CPC ...... F01N 3/24; F01N 3/2882; F01N 2250/02; F01N 2560/06; F01N 2610/02; F01N 2900/1602; B01D 53/9409; B01D 53/9413; B01D 53/9418
See application file for complete search history.

(56) References Cited

U.S. PATENT DOCUMENTS

| | | |
|---|---|---|
| 9,057,307 B2 | 6/2015 | Bandl-Konrad |
| 2015/0231565 A1 | 8/2015 | Wittrock |
| 2015/0240682 A1 | 8/2015 | Gupta |
| 2015/0275730 A1* | 10/2015 | Gupta ................ F01N 3/208 60/274 |
| 2017/0122159 A1* | 5/2017 | Bahrami ............. F01N 3/035 |
| 2017/0175607 A1* | 6/2017 | De Smet ........... F01N 13/0093 |

FOREIGN PATENT DOCUMENTS

| | | |
|---|---|---|
| DE | 10 2014 001 880 A1 | 8/2015 |
| EP | 2873823 A1 | 5/2015 |
| WO | 2001064319 A1 | 9/2001 |
| WO | 2004061278 A1 | 7/2004 |
| WO | 2013095214 A1 | 6/2013 |

* cited by examiner

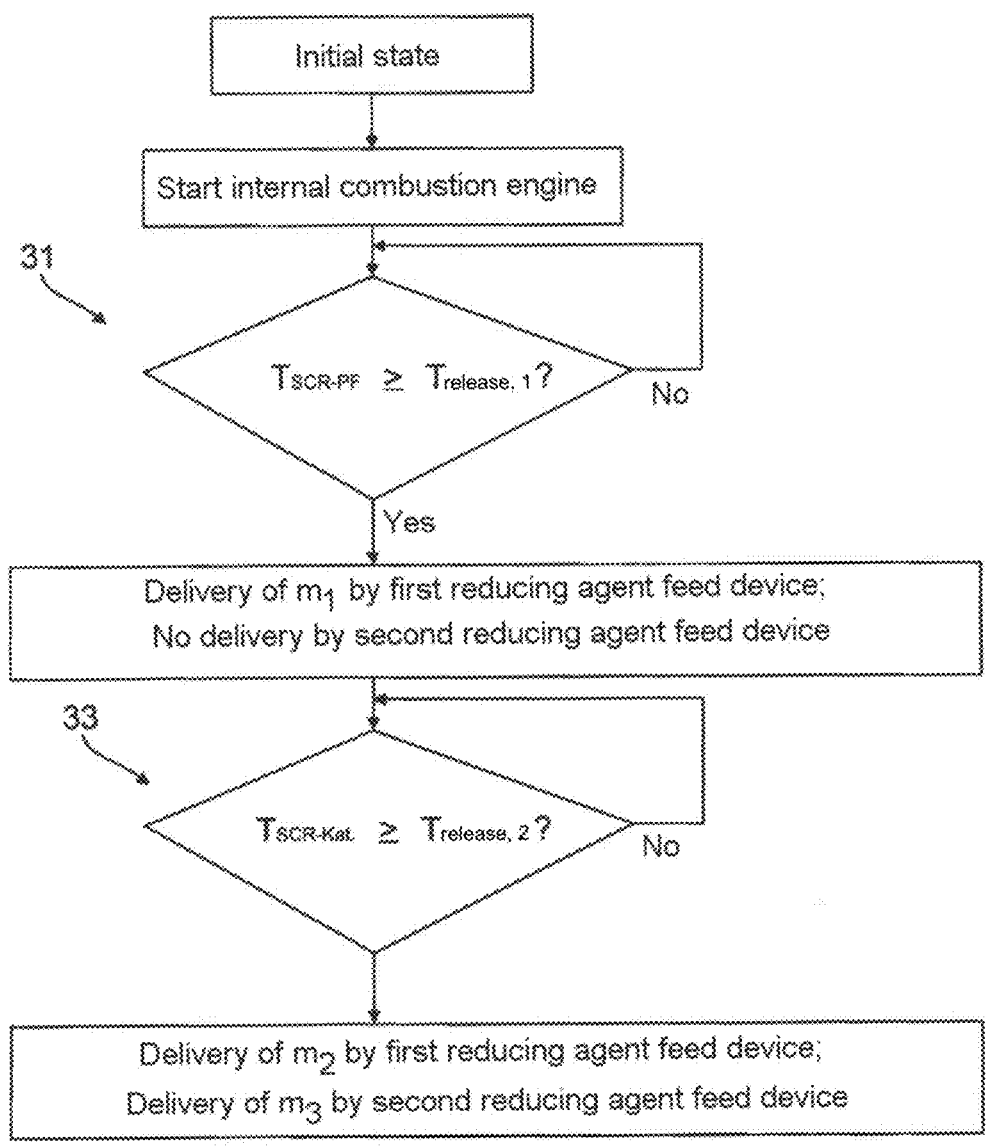

METHOD FOR THE OPERATION OF AN EXHAUST GAS AFTERTREATMENT SYSTEM

CROSS-REFERENCE TO RELATED APPLICATIONS

This application claims the priority of DE 10 2015 012 736.5 filed on Oct. 1, 2015, which is incorporated herein by reference.

BACKGROUND OF THE INVENTION

The invention relates to a method for the operation of an exhaust gas aftertreatment system for an internal combustion engine, in particular for a diesel engine, a device for performing the method, and to a vehicle, in particular a commercial vehicle, for performing the method and/or having the device.

The provision of a particle filter in an exhaust tract of an internal combustion engine which serves to filter out from the exhaust gas and to store particles, in particular carbon particles, contained in the exhaust gas from the internal combustion engine, is known. The regeneration of such a particle filter can be accomplished, for example, through combustion of the particles stored in the particle filter. For this combustion, high temperatures (approximately 600° C.) are necessary, which cannot routinely be attained in conventional operation of the internal combustion engine, in particular of a diesel engine. In order to be able nevertheless to burn the particles accumulated in the particle filter, measures are usually taken to briefly increase the temperature of the particle filter. Such measures may include an increase in the quantity of fuel injected, for example, or heating of the particle filter by a heating device or the backflow of exhaust gas. Another known way of regenerating a particle filter is the continuous regeneration trap (CRT). In this regeneration of the particle filter an oxidation catalytic converter, which serves to convert the nitrogen monoxide contained in the exhaust gas from the diesel engine into nitrogen dioxide, is usually arranged in the exhaust tract upstream of the particle filter, viewed in the direction of flow of the exhaust gas. Even at low exhaust gas temperatures (approximately 250° C.), the nitrogen dioxide formed reacts with the carbon particles stored in the particle filter, thereby regenerating the particle filter. This usually ensues according to the following equation for the reaction:

$$2NO_2 + C \rightarrow 2NO + CO_2$$

In addition to the CRT, it is also known to provide an SCR-active catalytic material, which reduces the nitrogen oxides contained in the exhaust gas from the internal combustion engine using ammonia as reducing agent. The ammonia is usually introduced into the exhaust tract upstream of the particle filter, viewed in the direction of flow of the exhaust gas, in the form of an aqueous urea solution ("AdBlue"). The reduction of the nitrogen oxides usually ensues according to the following equations for the reaction:

$$4NH_3 + 4NO + O_2 \rightarrow 4N_2 + 6H_2O$$

$$2NH_3 + NO + NO_2 \rightarrow 2N_2 + 3H_2O$$

$$4NH_3 + 3NO_2 \rightarrow 3.5N_2 + 6H_2O$$

As is apparent from the stated equations for the reaction, in a particle filter which is to be continuously regenerated, i.e., using a CRT, and which also comprises a SCR catalytic material, a situation arises in which there is competition vis-a-vis the nitrogen dioxide contained in the exhaust gas. In order to counteract such a competitive situation, DE 10 2014 001 880 A1 discloses the arrangement of a further SCR catalytic converter downstream of the particle filter, viewed in the direction of flow of the exhaust gas, and the similar introduction of an aqueous urea solution into the exhaust tract between the particle filter and the further SCR catalytic converter, viewed in the direction of flow of the exhaust gas. This allows the quantity of aqueous urea solution introduced into the exhaust tract upstream of the particle filter to be reduced in such a way as to ensure the continuous regeneration of the particle filter. The desired reduction of the nitrogen oxides contained in the exhaust gas is ensured by the aqueous urea solution introduced into the exhaust tract downstream of the particle filter and upstream of the further SCR catalytic converter.

SUMMARY OF THE INVENTION

An object of the invention is to provide a method for the operation of an exhaust gas aftertreatment system for an internal combustion engine, in particular for a diesel engine, together with a device, which effectively serve to increase the efficiency of the exhaust gas aftertreatment.

According to an embodiment of the invention a method is proposed for the operation of an exhaust gas aftertreatment system for an internal combustion engine, in particular for a diesel engine, an exhaust tract being provided with at least one SCR particle filter, the SCR particle filter serving to filter out from the exhaust gas and to store particles, in particular carbon particles, contained in an exhaust gas of the internal combustion engine, the SCR particle filter serving to reduce nitrogen oxides contained in the exhaust gas from the internal combustion engine using ammonia as reducing agent, a first reducing agent feed device provided, which serves for introducing the reducing agent, particularly in the form of an aqueous urea solution, into the exhaust tract upstream of the SCR particle filter, viewed in the direction of flow of the exhaust gas, continuous regeneration of the SCR particle filter being possible using nitrogen dioxide as oxidizing agent, at least one SCR catalytic converter element being arranged in or on the exhaust tract downstream of the SCR particle filter and serving to reduce nitrogen oxides likewise contained in the exhaust gas from the internal combustion engine using ammonia as reducing agent, and a second reducing agent feed device being provided, which serves for introducing the reducing agent, particularly also in the form of an aqueous urea solution, into the exhaust tract downstream of the SCR particle filter and upstream of the SCR catalytic converter element. According to the invention a control unit is provided, which regulates and/or controls the quantity of reducing agent introduced into the exhaust tract by the first reducing agent feed device and/or by the second reducing agent feed device as a function of the temperature of the SCR particle filter.

In this way the efficiency of the exhaust gas aftertreatment is effectively improved, since the quantity of reducing agent introduced into the exhaust tract by the first reducing agent feed device and/or the quantity of reducing agent introduced into the exhaust tract by the second reducing agent feed device is now adjusted or varied as a function of the temperature of the SCR particle filter. The temperature of the SCR particle filter has a great influence on the SCR catalytic effect and the continuous regeneration of the SCR particle filter and represents an important parameter in optimizing the system and the delivery of the reducing agent into the exhaust tract. Using the temperature of the SCR particle filter makes it possible to achieve the desired continuous regeneration of the SCR particle filter and the desired reduction of the nitrogen oxides contained in the exhaust gas from the internal combustion engine whilst at the same time minimizing the quantity of reducing agent introduced into the exhaust tract. A low reducing agent consumption reduces the operating costs of the exhaust gas aftertreatment system and, where the exhaust gas aftertreatment system is provided on a vehicle, increases the range of the vehicle.

Here the temperature of the SCR particle filter can be obtained, for example, by providing temperature sensors, in particular thermocouples, in or on the exhaust tract. In one embodiment a first temperature sensor is disposed upstream of the SCR particle filter and a second temperature sensor is disposed downstream of the particle filter, in order to measure the exhaust gas temperature, the measured values from the sensors being used by the control unit to determine the temperature of the SCR particle filter.

Furthermore, the term "exhaust tract" is here expressly to be interpreted in a wider sense. Thus the exhaust tract here encompasses all areas and components through which the exhaust gas from the internal combustion flows.

In a preferred embodiment of the method no reducing agent is introduced into the exhaust tract by the first reducing agent feed device if the actual temperature of the SCR particle filter is lower than a defined particle filter temperature value. A defined quantity of reducing agent may then be introduced into the exhaust tract by the first reducing agent feed device, if the actual temperature of the SCR particle filter exceeds the defined particle filter temperature value. Thus reducing agent can be introduced into the exhaust tract by the first reducing agent feed device only when the SCR particle filter has a sufficiently high SCR catalytic effect.

The defined particle filter temperature value is preferably lower than a SCR response temperature of the SCR particle filter, at which nitrogen oxides contained in the exhaust gas can be effectively reduced by the SCR particle filter. This reliably ensures that on reaching the SCR response temperature of the SCR particle filter a sufficient quantity of reducing agent is already present on the SCR particle filter to reduce the nitrogen oxides flowing through the SCR particle filter. Here the SCR response temperature of the SCR particle filter preferably lies in a temperature range from 220° C. to 250° C. Alternatively, however, the defined particle filter temperature value could naturally also be equal or identical to the SCR response temperature of the SCR particle filter.

In a further preferred embodiment of the method, the control unit regulates and/or controls the quantity of reducing agent introduced into the exhaust tract by the first reducing agent feed device and/or the quantity of reducing agent introduced into the exhaust tract by the second reducing agent feed device also as a function of the temperature of the SCR catalytic converter element. In this way the efficiency of the exhaust gas aftertreatment can be further increased. The temperature of the SCR catalytic converter element can likewise be obtained by providing temperature sensors, in particular thermocouples, in or on the exhaust tract, including a first temperature sensor upstream of the SCR particle filter and a second temperature sensor downstream of the SCR catalytic converter element in order to measure the exhaust gas temperature, the measured values from which sensors are used by the control unit to determine the temperature of the SCR catalytic converter element.

Here, preferably no reducing agent is introduced into the exhaust tract by the second reducing agent feed device if the actual temperature of the SCR catalytic converter element is lower than a defined catalytic converter element temperature value. A defined quantity of reducing agent may then be introduced into the exhaust tract by the second reducing agent feed device, if the actual temperature of the SCR particle filter exceeds the defined catalytic converter element temperature value. Reducing agent can thereby be introduced into the exhaust tract only when the SCR catalytic converter element has a sufficiently high SCR catalytic effect. This saves reducing agent and serves to counteract a flow of unused ammonia from the exhaust tract into the surroundings.

In principle the defined catalytic converter temperature value may also be equal or identical to the SCR response temperature of the SCR catalytic converter element. It is preferable, however, if the defined catalytic converter element temperature value is likewise lower than the SCR response temperature, at which nitrogen oxides contained in the exhaust gas can be reduced by the SCR catalytic converter element. A reduction of the nitrogen oxides by the SCR catalytic converter element is thereby also ensured when the SCR catalytic converter element reaches its SCR response temperature. Here the SCR response temperature of the SCR catalytic converter element preferably lies in a temperature range from 220° C. to 250° C.

The defined particle filter temperature value and/or the defined catalytic converter element temperature value more preferably lie in a temperature range from 150° C. to 190° C. Such a temperature range ensures an especially efficient use of the reducing agent.

Furthermore, if the actual temperature of the SCR particle filter exceeds the defined particle filter temperature value and the actual temperature of the SCR catalytic converter element is lower than the defined catalytic converter temperature value, such a quantity of reducing agent is preferably introduced into the exhaust tract by the first reducing agent feed device that a substantially stoichiometric reducing agent-nitrogen oxide ratio prevails in the area of the first reducing agent feed device. A large quantity of nitrogen oxides contained in the exhaust gas can thereby be reduced by the SCR particle filter, if the SCR catalytic converter element has not yet attained its operating temperature. Moreover, such a quantity of reducing agent counteracts any deposit of aqueous urea solution in the exhaust tract. As an alternative to this stoichiometric introduction of reducing agent, such a quantity of reducing agent may also be introduced into the exhaust tract by the first reducing agent feed device that a greater quantity of reducing agent is present in the area of the first reducing agent feed device than is required for a stoichiometric reducing agent-nitrogen oxide ratio. A particularly large quantity of nitrogen oxides can thereby be reduced by the SCR particle filter.

If the actual temperature of the SCR particle filter exceeds the defined particle filter temperature value and the actual temperature of the SCR catalytic converter element exceeds the defined catalytic converter temperature value, such a quantity of reducing agent is preferably introduced into the exhaust tract by the first reducing agent feed device, that a quantity of reducing agent smaller than is required for a stoichiometric reducing agent-nitrogen oxide ratio is present in the area of the first reducing agent feed device. This ensures that the SCR particle filter is continuously regenerated. Here such a quantity of reducing agent is preferably introduced into the exhaust tract by the first reducing agent feed device, that 50% to 80% of the quantity of reducing agent required for a stoichiometric reducing agent-nitrogen oxide ratio is present in the area of the first reducing agent feed device. An effective continuous regeneration of the SCR particle filter together with an effective reduction of the nitrogen oxides contained in the exhaust gas oxides are thereby achieved simultaneously by the SCR particle filter.

Furthermore, if the actual temperature of the SCR particle filter exceeds the defined particle filter temperature value and the actual temperature of the SCR catalytic converter element exceeds the defined catalytic converter temperature value, such a quantity of reducing agent is preferably introduced into the exhaust tract by the second reducing agent feed device that a substantially stoichiometric reducing agent-nitrogen oxide ratio prevails in the area of the second reducing agent feed device. A large quantity of nitrogen oxides contained in the exhaust gas from the internal combustion engine can thereby be reduced by the SCR catalytic converter element. Moreover, such a quantity of reducing agent counteracts any deposit of aqueous urea solution in the exhaust tract. As an alternative, however, such a quantity of reducing agent could also be introduced into the exhaust tract by the second reducing agent feed device that a greater quantity of reducing agent is present in the area of the second reducing agent feed device than is required for a stoichiometric reducing agent-nitrogen oxide ratio. An especially large quantity of nitrogen oxides can thereby be reduced by the SCR catalytic converter element.

In a further embodiment at least one oxidation catalytic converter, which oxidizes nitrogen monoxide contained in the exhaust gas from the internal combustion engine to form nitrogen dioxide, is arranged in or on the exhaust tract upstream of the SCR particle filter. Such an oxidation catalytic converter reliably serves to ensure the continuous regeneration of the SCR particle filter.

At least one nitrogen oxide storage element that stores and releases nitrogen oxides contained in the exhaust gas as a function of the exhaust gas temperature, is furthermore preferably arranged in or on the exhaust tract. Here the nitrogen oxide storage element preferably stores the nitrogen oxides contained in the exhaust gas when the temperature of the nitrogen oxide storage element is lower than a defined temperature limit. If the nitrogen oxide storage element exceeds the defined temperature limit, the nitrogen oxide storage element then releases the stored nitrogen oxides. The temperature limit here preferably lies in a range from 100° C. to 200° C., more preferably in a range from 180° C. to 200° C. Such a nitrogen oxide storage element ensures that nitrogen oxides contained in the exhaust gas from the internal combustion engine are at first stored, if the SCR particle filter and/or at least the one SCR catalytic converter element has not yet reached its operating temperature. Once the SCR particle filter and/or the SCR catalytic converter element reach their operating temperature, the stored nitrogen oxides are released again and reduced by the SCR particle filter and/or of the SCR catalytic converter element. Here the nitrogen oxide storage element preferably contains barium nitrate and/or cerium oxide as storage material. The nitrogen oxide storage element may be arranged in or on the exhaust tract, for example, upstream of the SCR particle filter and/or an oxidation catalytic converter. Alternatively, and/or in addition the nitrogen oxide storage element may also be provided directly on the SCR particle filter and/or on the oxidation catalytic converter.

The SCR particle filter and/or the SCR catalytic converter element preferably contains copper and/or vanadium and/or at least one zeolite material as SCR-effective catalytic material. Such a catalytic material ensures an especially effective reduction of the nitrogen oxides contained in the exhaust gas.

The object of the present invention is also met by a device having an internal combustion engine, in particular a diesel engine, and an exhaust tract, the exhaust tract comprising at least one SCR particle filter, which serves to filter out from the exhaust gas and to store particles, in particular carbon particles, contained in an exhaust gas of the internal combustion engine, the SCR particle filter serving to reduce nitrogen oxides contained in the exhaust gas from the internal combustion engine using ammonia as reducing agent, a first reducing agent feed device, which serves for introducing the reducing agent, particularly in the form of an aqueous urea solution, in the exhaust tract upstream of the SCR particle filter, viewed in the direction of flow of the exhaust gas, continuous regeneration of the SCR particle filter being possible using nitrogen dioxide as oxidizing agent, at least one SCR catalytic converter element arranged in or on the exhaust tract downstream of the SCR particle filter and serving to reduce nitrogen oxides likewise contained in the exhaust gas from the internal combustion engine using ammonia as reducing agent, and a second reducing agent feed device, which serves for introducing the reducing agent, particularly also in the form of an aqueous urea solution, into the exhaust tract downstream of the SCR particle filter and upstream of the SCR catalytic converter element. According to the invention a control unit is provided, which regulates and/or controls the quantity of reducing agent introduced into the exhaust tract by the first reducing agent feed device and/or by the second reducing agent feed device as a function of the temperature of the SCR particle filter.

The advantages accruing from the device according to the invention are identical to the advantages of the method according to the invention already disclosed, so that these will not be repeated at this juncture.

The invention also relates to a vehicle, in particular a commercial vehicle, for implementing the method according to the invention and/or comprising the device according to the invention. The advantages accruing from this are likewise identical to the advantages of the method according to the invention already disclosed and similarly will not be repeated at this juncture. Alternatively to the vehicle, however, the device may naturally also be stationary or fixed.

Except in cases of clear dependencies or irreconcilable alternatives, for example, the advantageous embodiments and/or developments of the invention explained above may be applied individually or also in any combination with one another.

BRIEF DESCRIPTION OF THE DRAWINGS

The invention and its advantageous embodiments and/or developments together with the advantages thereof are explained in more detail below, merely by way of example, referring to drawings, of which:

FIG. 4 is a flow diagram explaining the sequence of the method according to the invention.

DETAILED DESCRIPTION OF THE PREFERRED EMBODIMENTS

Figure 1:
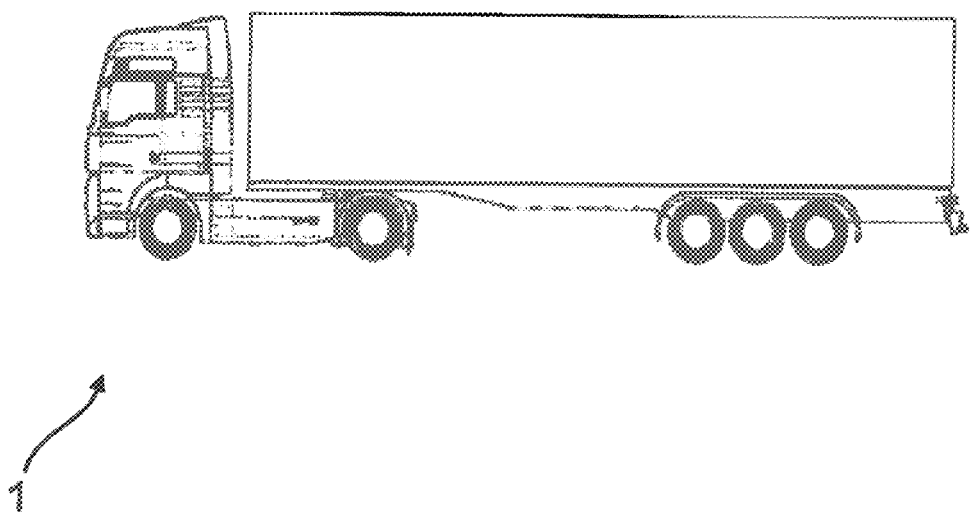
FIG. 1 is a side view of a truck having the device according to the invention.

FIG. 1 shows a vehicle 1, here embodied as a truck, for example, having the device 3 (FIG. 2) according to the invention.

Figure 2:
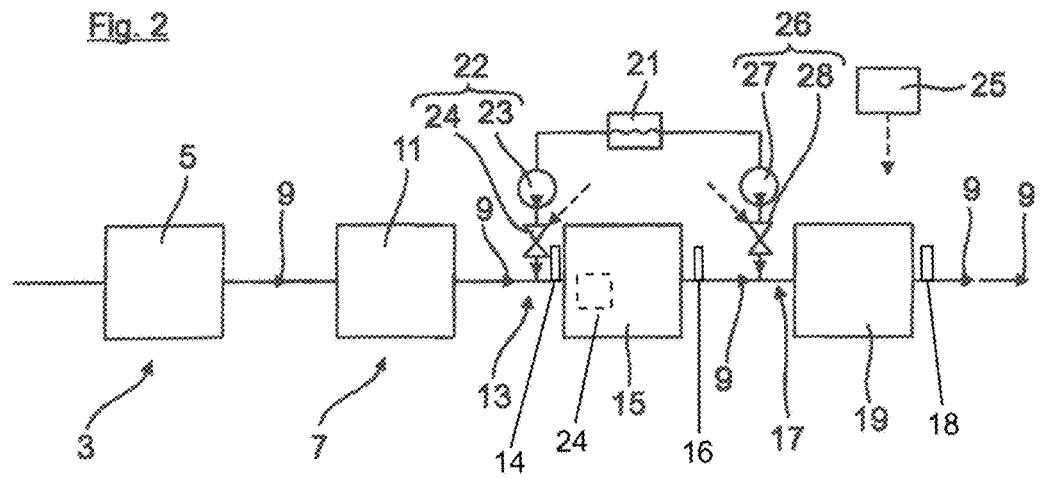
FIG. 2 is a schematic block drawing of the device according to the invention.

As FIG. 2 shows, the device 3 comprises an internal combustion engine 5 as drive unit for the vehicle 1 and an exhaust tract 7, which is connected to the internal combustion engine 5 and through which an exhaust gas 9 from the internal combustion engine 5 flows. Viewed in the direction of flow of the exhaust gas, the exhaust tract 7 here comprises an oxidation catalytic converter 11, a first reducing agent introduction area 13, a SCR particle filter 15, a second reducing agent introduction area 17, and a SCR catalytic converter element 19.

Starting from the internal combustion engine 5, the exhaust gas 9 first flows through the oxidation catalytic converter 11, which serves to partially oxidize nitrogen monoxide contained in the exhaust gas 9 to form nitrogen dioxide. Then the exhaust gas 9 flows past the first reducing agent introduction area 13, where a reducing agent for reducing the nitrogen oxides contained in the exhaust gas 9, here in the form of an aqueous urea solution, for example, can be introduced into the exhaust tract 7. The aqueous urea solution here is stored in a urea tank 21 of the device 3 and is introduced into the exhaust tract 7 by a first reducing agent feed device 22. The reducing agent feed device 22 here comprises a pump 23 and a straight-way valve 24, for example. The straight-way valve 24 here is connected and sends signals to a control unit 25, which serves to regulate and control the straight-way valve 24 and therefore the quantity of aqueous urea solution introduced into the exhaust tract 7 at the second reducing agent introduction area 17.

The exhaust gas 9 then flows through the SCR particle filter 15, which serves to filter out from the exhaust gas 9 and to store particles, in particular carbon particles, contained in the exhaust gas 9 from the internal combustion engine 5. The SCR particle filter 15 here is continuously regenerated by the nitrogen dioxide formed by the oxidation catalytic converter 11. As an additional measure for regenerating the SCR particle filter 15, the particles accumulated in the SCR particle filter 15 could also be burned at defined times. Here the times may be fixed at defined time intervals, for example, or determined by calculating the actual storage capacity of the SCR particle filter 15. The particles may be burned, for example, by injecting an increased quantity of fuel, heating the particle filter or causing exhaust gas to back up. In addition, the SCR particle filter 15 also comprises a SCR catalytic material, which serves to reduce nitrogen oxides contained in the exhaust gas 9 from the internal combustion engine 5 using ammonia as reducing agent. The ammonia is introduced into the exhaust tract by the reducing agent feed device 22 in the form of the aqueous urea solution. The SCR particle filter 15 preferably comprises copper and/or vanadium and/or at least zeolite as SCR catalytic material.

From the SCR particle filter 15 the exhaust gas 9 from the internal combustion engine 5 flows past the second reducing agent introduction area 17, where the aqueous urea solution stored in the urea tank 21 can likewise be introduced into the exhaust tract 7. The aqueous urea solution is here introduced into the exhaust tract 7 by a second reducing agent feed device 26. The second reducing agent feed device 26 here likewise comprises a pump 27 and a straight-way valve 28, for example. The straight-way valve 28 here is likewise connected and sends signals to a control unit 25, which serves to regulate and control the straight-way valve 28 and therefore the quantity of aqueous urea solution introduced into the exhaust tract 7 at the second reducing agent introduction area 17. The control device 25 controls the straight-way valves 24 and 28 based on temperatures of the SCR particle filter 15 and the SCR catalytic converter element 19, e.g., using temperature sensors 14, 16, 18.

Finally, the exhaust gas 9 from the internal combustion engine 5 flows through the SCR catalytic converter element 19, which serves to reduce nitrogen oxides likewise contained in the exhaust gas 9 from the internal combustion engine using ammonia as reducing agent. The ammonia needed for this purpose is introduced into the exhaust tract 7 by the reducing agent feed device 22 and/or by the reducing agent feed device 26. The SCR catalytic converter element 19 likewise preferably comprises copper and/or vanadium and/or at least one zeolite as SCR catalytic material.

In an optional embodiment, a nitrogen oxide storage element 24 (shown in dashed lines) that stores and releases nitrogen oxide as a function of the exhaust gas temperature is arranged on the SCR particle filter 15. Alternatively, the nitrogen oxide storage element 24 could be arranged in the exhaust tract 7 upstream of the SCR particle filter 15 and/or upstream of the SCR catalytic converter element 19, and/or on the SCR catalytic converter element 19.

Figure 3:
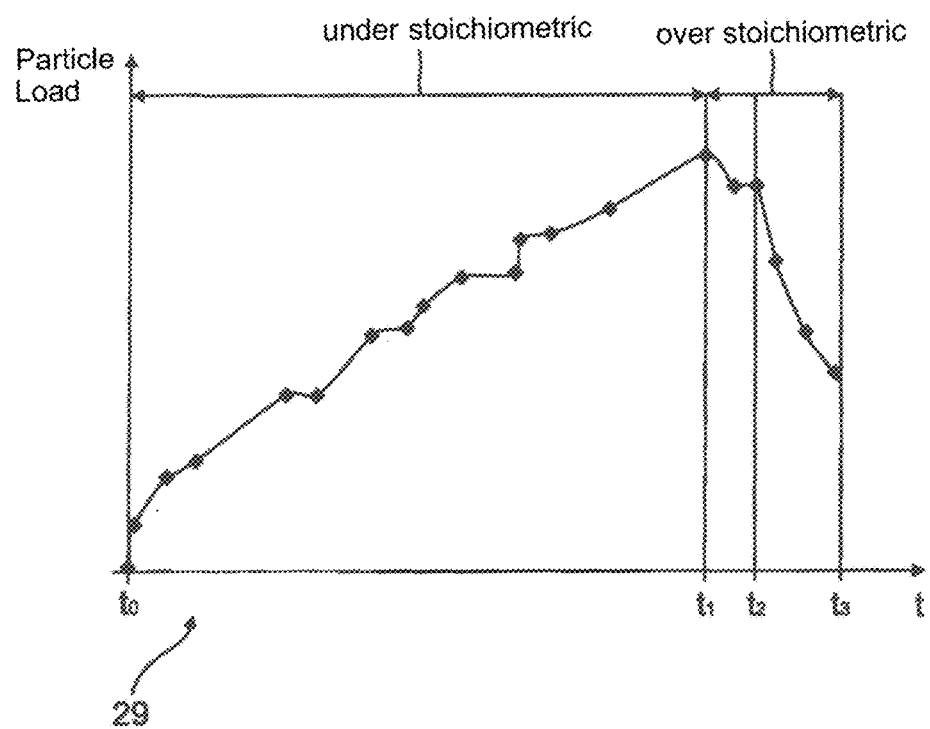
FIG. 3 is a diagram explaining the method according to the invention.

FIG. 3 shows a diagram 29 representing the loading of the SCR particle filter 15 as a function of the quantity of aqueous urea solution introduced into the exhaust tract 7 by the reducing agent feed device 22. From a time to up to a time $t_1$ such a quantity of aqueous urea solution is introduced into the exhaust tract 7 by the reducing agent feed device 22 that a greater quantity of reducing agent is present on the first reducing agent introduction area 13 than is required for a stoichiometric reducing agent-nitrogen oxide ratio. From the time $t_1$ to a time $t_3$ the reducing agent feed device 22 introduces such a quantity of aqueous urea solution into the exhaust tract 7, that a quantity of reducing agent smaller than is required for a stoichiometric reducing agent-nitrogen oxide ratio is present on the first reducing agent introduction area 13. Between the time $t_1$ and a time $t_2$ the reducing agent feed device 22 here introduces such a quantity of aqueous urea solution into the exhaust tract 7, that 80% of the quantity of reducing agent which is required for a stoichiometric reducing agent-nitrogen oxide ratio is present on the first reducing agent introduction area 13. Between the time $t_2$ and the time $t_3$ the reducing agent feed device 22 introduces such a quantity of aqueous urea solution into the exhaust tract 7 that 50% of the quantity of reducing agent which is required for a stoichiometric reducing agent-nitrogen oxide ratio is present on the first reducing agent introduction area 13.

It can be seen from the diagram 29 that the particle loading of the SCR particle filter 15 increases, when the reducing agent feed device 22 introduces a quantity of aqueous urea solution into the exhaust tract 7 in excess of the stoichiometric quantity. The reason for this is the reduced continuous regeneration of the SCR particle filter 15, due to the competing reaction of the ammonia introduced with nitrogen dioxide. If a quantity of aqueous urea solution less than the stoichiometric quantity is introduced into the exhaust tract 7, the particle loading of the SCR particle filter 15 diminishes again. The diagram 29 therefore clearly shows that the continuous regeneration of the SCR particle filter 15 is disturbed by the introduction of excessive quantities of ammonia into the exhaust tract 7.

In addition, the quantities of reducing agent introduced into the exhaust tract 7 by the reducing agent feed devices 22, 26 are regulated and controlled here by the control unit 25 as a function of the temperature of the SCR particle filter 15 and as a function of the temperature of the SCR catalytic converter element 19. This regulation and control is explained in more detail below with reference to FIG. 4.

In an initial state the internal combustion engine 5 here is switched off, for example. Here no aqueous urea solution is introduced into the exhaust tract 7. After starting the internal combustion engine 5 at step 30, it is examined, in a step 31, whether the temperature of the SCR particle filter $T_{SCR-PF}$ is greater than or equal to a first release temperature $T_{release,1}$. The release temperature $T_{release,1}$ here, for example, is lower than a SCR response temperature of the SCR particle filter 15, at which the nitrogen oxides contained in the exhaust gas 9 can be reduced by the SCR particle filter 15 or at which the SCR particle filter 15 reaches its operating temperature for reducing the nitrogen oxides.

If the temperature of the SCR particle filter 15 $T_{SCR-PF}$ is greater than or equal to the release temperature $T_{release,1}$, the first reducing agent feed device 22 introduces a first defined mass flow $m_1$ of aqueous urea solution into the exhaust tract 7. The first defined mass flow $m_1$ here is designed in such a way that a substantially stoichiometric reducing agent-nitrogen oxide ratio prevails in the area of the first reducing agent feed device 22. The second reducing agent feed device 26 here still does not introduce any aqueous urea solution into the exhaust tract 7.

In a step 33 it is then examined whether the temperature of the SCR catalytic converter element 19 $T_{SCR-Kat}$ is greater than or equal to a second release temperature $T_{release,2}$. The release temperature $T_{release,2}$ here, for example is likewise lower than a SCR response temperature of the SCR catalytic converter element 19, at which the nitrogen oxides contained in the exhaust gas 9 can be reduced by the SCR catalytic converter element 19 or at which the SCR particle filter 15 reaches its operating temperature for reducing the nitrogen oxides.

If the temperature of the SCR catalytic converter element 19 $T_{SCR-Kat}$ is greater than or equal to the release temperature $T_{release,2}$, the first reducing agent feed device 22 introduces a second defined mass flow $m_2$ of aqueous urea solution into the exhaust tract 7. The second defined mass flow $m_2$ here is designed in such away that a quantity of reducing agent smaller than is required for a stoichiometric reducing agent-nitrogen oxide ratio is present in the area of the first reducing agent feed device 22. The second reducing agent feed device 26 then introduces a third defined mass flow $m_3$ of aqueous urea solution into the exhaust tract 7. The third defined mass flow $m_3$ is here designed in such a way that a substantially stoichiometric reducing agent-nitrogen oxide ratio prevails in the area of the second reducing agent feed device 26.

This regulation and control of the reducing agent feed devices 22, 26 serves for particularly efficient cleaning of the exhaust gas 9 from the internal combustion engine 5.

LIST OF REFERENCE NUMERALS

1 vehicle
3 device
5 internal combustion engine
7 exhaust tract
9 exhaust gas
11 oxidation catalytic converter
13 reducing agent introduction area
15 SCR particle filter
17 reducing agent introduction area
19 SCR catalytic converter element
21 urea tank
22 reducing agent feed device
23 pump
24 straight-way valve
25 control unit
26 reducing agent feed device
27 pump
28 straight-way valve
29 diagram
31 step
33 step
$m_1$ first mass flow
$m_2$ second mass flow
$m_3$ third mass flow
t time
$t_0$ start time
$t_1$ first time
$t_2$ second time
$t_3$ third time
$T_{release1}$ first release temperature
$T_{release2}$ second release temperature
$T_{SCR-PF}$ temperature of SCR particle filter
$T_{SCR-Kat}$ temperature of SCR catalytic converter element

The invention claimed is:

1. A method for operating an exhaust gas aftertreatment system in an exhaust tract of an internal combustion engine, the exhaust gas aftertreatment system including:
    an SCR particle filter configured to filter out and store particles contained in an exhaust gas generated by the internal combustion engine and to reduce nitrogen oxides contained in the exhaust gas using ammonia as a reducing agent, the SCR particle filter being configured to be continuously regenerated using nitrogen dioxide as another oxidizing agent,
    a first reducing agent feed device configured to introduce the reducing agent into a first area of the exhaust tract upstream of the SCR particle filter with respect to a direction of a flow of the exhaust gas,
    an SCR catalytic converter element arranged downstream of the SCR particle filter configured to reduce nitrogen oxides contained in the exhaust gas using the reducing agent, and
    a second reducing agent feed device configured to introduce the reducing agent into a second area of the exhaust tract downstream of the SCR particle filter and upstream of the SCR catalytic converter element,
    the method comprising:
    measuring an actual temperature of the SCR particle filter using a first temperature sensor; and
    regulating a quantity of the reducing agent introduced into the exhaust tract by at least one of the first reducing agent feed device and the second reducing agent feed device as a function of the actual temperature of the SCR particle filter,
    wherein the step of regulating includes introducing by the first reducing agent feed device no reducing agent into the exhaust tract when the actual temperature of the SCR particle filter is lower than a defined particle filter temperature value, and introducing by the first reducing agent feed device a defined quantity of reducing agent into the exhaust tract when the actual temperature of the SCR particle filter exceeds the defined particle filter temperature value, and the defined particle filter temperature value is lower than an SCR response temperature of the SCR particle filter at which nitrogen oxides contained in the exhaust gas are reduced by the SCR particle filter.

2. The method according to claim 1, wherein the SCR response temperature of the SCR particle filter is in a temperature range from 220° C. to 250° C.

3. The method according to claim 1, further comprising the step of measuring an actual temperature of the SCR catalytic converter element, wherein the step of regulating further comprises regulating the quantity of the reducing agent introduced into the exhaust tract by at least one of the first reducing agent feed device and the second reducing agent feed device as a function of the actual temperature of the SCR catalytic converter element.

4. The method according to claim 3, wherein the step of regulating includes introducing by the second reducing agent feed device no reducing agent into the exhaust tract when the measured temperature of the SCR catalytic converter element is lower than a defined catalytic converter element temperature value, and introducing by the second reducing agent feed device a defined quantity of the reducing agent into the exhaust tract when the measured temperature of the SCR particle filter exceeds the defined catalytic converter element temperature value.

5. The method of claim 4, wherein the defined catalytic converter element temperature value is lower than an SCR response temperature of the SCR catalytic converter element at which nitrogen oxides contained in the exhaust gas are reduced by the SCR particle filter.

6. The method of claim 5, wherein the SCR response temperature of the SCR particle filter is in a temperature range from 220° C. to 250° C.

7. The method of claim 4, wherein the defined catalytic converter element temperature value is in a temperature range from 150° C. to 190° C.

8. The method of claim 1, wherein the defined particle filter temperature value is in a temperature range from 150° C. to 190° C.

9. The method of claim 1, further comprising the step of measuring an actual temperature of the SCR catalytic converter element, wherein when the actual temperature of the SCR particle filter exceeds the defined particle filter temperature value and the actual temperature of the SCR catalytic converter element is lower than the defined catalytic converter element temperature value, the step of regulating includes introducing into the exhaust tract by the first reducing agent feed device a first quantity of reducing agent such that a substantially stoichiometric reducing agent-nitrogen oxide ratio prevails in the first area of the exhaust tract.

10. The method of claim 1, further comprising the step of measuring an actual temperature of the SCR catalytic converter element, wherein when the actual temperature of the SCR particle filter exceeds the defined particle filter temperature value and the actual temperature of the SCR catalytic converter element exceeds the defined catalytic converter element temperature value, the step of regulating includes introducing into the exhaust tract by the first reducing agent feed device a second quantity of reducing agent such that a quantity of reducing agent smaller than is required for a stoichiometric reducing agent-nitrogen oxide ratio is present in the first area of the exhaust tract.

11. The method of claim 10, wherein when the actual temperature of the SCR particle filter exceeds the defined particle filter temperature value and the actual temperature of the SCR catalytic converter element exceeds the defined catalytic converter element temperature value, the step of regulating includes introducing into the exhaust tract by the second reducing agent feed device a third quantity of reducing agent such that a substantially stoichiometric reducing agent-nitrogen oxide ratio prevails in the second area of the exhaust tract.

12. The method of claim 1, wherein the exhaust gas aftertreatment system includes an oxidation catalytic converter arranged upstream of the SCR particle filter, the method further comprising oxidizing by the oxidation catalytic converter nitrogen monoxide in the exhaust gas to form nitrogen dioxide.

13. The method of claim 1, wherein the exhaust gas aftertreatment system includes a nitrogen oxide storage element, the method further comprising storing and releasing by the nitrogen oxide storage element nitrogen oxides contained in the exhaust gas as a function of the exhaust gas temperature, the nitrogen oxide storage element containing at least one of barium nitrate and cerium oxide as a storage material.

14. The method of claim 1, wherein at least one of the SCR particle filter and the SCR catalytic converter element contains copper, vanadium, or at least one zeolite material as an SCR catalytic material.

15. A device including an internal combustion engine with an exhaust tract and an exhaust gas aftertreatment system incorporated in the exhaust tract, the exhaust gas aftertreatment system comprising:
  an SCR particle filter configured to filter out and store particles contained in an exhaust gas generated by the internal combustion engine and to reduce nitrogen oxides contained in the exhaust gas using ammonia as a reducing agent, the SCR particle filter being configured to be continuously regenerated using nitrogen dioxide as another oxidizing agent;
  a first reducing agent feed device configured to introduce the reducing agent into the exhaust tract upstream of the SCR particle filter with respect to a direction of a flow of the exhaust gas;
  an SCR catalytic converter element arranged downstream of the SCR particle filter and configured to reduce nitrogen oxides contained in the exhaust gas using the reducing agent;
  a second reducing agent feed device configured to introduce the reducing agent into the exhaust tract downstream of the SCR particle filter and upstream of the SCR catalytic converter element; and
  a control unit regulating a quantity of the reducing agent introduced into the exhaust tract by at least one of the first reducing agent feed device and the second reducing agent feed device as a function of a temperature of the SCR particle filter, wherein the control unit controls the first reducing agent feed device so that no reducing agent is introduced into the exhaust tract when the actual temperature of the SCR particle filter is lower than a defined particle filter temperature value, and further controls the first reducing agent feed device so that a defined quantity of reducing agent is introduced into the exhaust tract when the actual temperature of the SCR particle filter exceeds the defined particle filter temperature value, the defined particle filter temperature value being lower than an SCR response temperature of the SCR particle filter at which nitrogen oxides contained in the exhaust gas are reduced by the SCR particle filter.

16. A vehicle comprising the device according to claim 15.

* * * * *